US006878776B1

(12) United States Patent
Pascault et al.

(10) Patent No.: US 6,878,776 B1
(45) Date of Patent: Apr. 12, 2005

(54) THERMOSETTING RESIN COMPOSITIONS COMPRISING CROSS-LINKED REACTIVE MICROPARTICLES WITH IMPROVED MECHANICAL STRENGTH

(75) Inventors: Jean-Pierre Pascault, Villerubanne (FR); Ludovic Valette, Haguenau (FR); Philippe Barbeau, Creil (FR); Benoit Magny, Verneuil en Halatte (FR)

(73) Assignee: Cray Valley, S.A., Puteaux (FR)

( * ) Notice: Subject to any disclaimer, the term of this patent is extended or adjusted under 35 U.S.C. 154(b) by 0 days.

(21) Appl. No.: 09/937,550

(22) PCT Filed: Mar. 24, 2000

(86) PCT No.: PCT/FR00/00741

§ 371 (c)(1),
(2), (4) Date: Dec. 12, 2001

(87) PCT Pub. No.: WO00/59953

PCT Pub. Date: Oct. 12, 2000

(30) Foreign Application Priority Data

Mar. 31, 1999 (FR) ............................................ 99 04042
Mar. 31, 1999 (FR) ............................................ 99 04041

(51) Int. Cl.$^7$ ................................................. C08F 8/30

(52) U.S. Cl. ........................ 525/113; 525/123; 525/127; 525/170; 525/178; 525/181; 525/182; 525/183; 525/185; 525/211

(58) Field of Search ................................ 525/113, 123, 525/127, 170, 178, 181, 182, 183, 185, 211

(56) References Cited

U.S. PATENT DOCUMENTS

| | | | | | |
|---|---|---|---|---|---|
| 4,777,213 | A | * | 10/1988 | Kanda et al. ................ | 525/114 |
| 4,950,792 | A | * | 8/1990 | Althaus et al. .............. | 564/335 |
| 5,120,796 | A | | 6/1992 | Fukuchi ....................... | 525/286 |
| 5,494,974 | A | * | 2/1996 | Asanaka et al. | |
| 6,274,673 | B1 | * | 8/2001 | Roth et al. ................... | 525/113 |
| 6,586,097 | B1 | * | 7/2003 | Pascault et al. ............. | 428/402 |

FOREIGN PATENT DOCUMENTS

| | | | | |
|---|---|---|---|---|
| EP | 0 930 327 A2 | 7/1999 | ......... | C08G/63/672 |
| GB | 2178048 | 2/1987 | ............. | C08F/2/14 |
| WO | 98/28286 A2 | 7/1998 | ......... | C07D/303/00 |
| WO | 98/28287 | 7/1998 | ......... | C07D/303/16 |
| WO | 98/28286 A3 | 8/1998 | ......... | C07D/301/12 |
| WO | 98/45349 | 10/1998 | ........... | C08G/59/00 |

OTHER PUBLICATIONS

Chemical Abstract: XP–002123686: Nonaqueous Resin Dispersions.
Chemical Abstract: XP–002123687: Nonaqueous Emulsions of Acrylic Polymers.

Lin, King–Fu, et al., *Core–Shell Particles Designed for Toughening Epoxy Resins. I. Preparation and Characterization of Core–Shell Particles*, Journal of Applied Polymer Science, 1998, vol. 69, pp. 2069–2078.
Becu–Longuet, L., et al., *Epoxy Networks Toughened by Core–Shell Particles: Influence of the Particle Structure and Size on the Rheological and Mechanical Properties*, Journal of Applied Polymer Science, 1999, vol. 72, pp. 849–858.
Girard–Reydet, E., et al., *Use of Block Copolymers to Control the Morphologies and Properties of Thermoplastic/Thermoset Blends*, Polymer 40, 1999, pp. 1677–1687.
Ruseckaite, Roxana A., et al., *Castor–Oil–Modified Epoxy Resins as Model Systems of Rubber–Modified Thermosets. 1: Thermodynamic Analysis of the Phase Separation*, Polymer International, 1993, vol. 30, pp. 11–16.
Suspene, Laurent, et al., *Additive Effects on the Toughening of Unsaturated Polyester Resins*, American Chemical Society, 1993, vol. 233, pp. 163–186.
Bascom, W.D., et al., *Fracture of Elastomer–Modified Epoxy Polymers*, American Chemical Society, 1989, vol. 222, pp. 135–172.
Dusek, Karel, et al., *Formation of Epoxy Networks, Including Reactive Liquid Elastomers*, American Chemical Society, 1989, vol. 222, pp. 303–319.
Siebert, Alan R., et al., *Elastomer–Modified Epoxy Model Adhesives Cured with an Accelerated Dicyandiamide System*, American Chemical Society, 1989, vol. 222, pp. 389–401.
Grossman, Richard F., *Blends of Unsaturated Polyesters with High–Molecular–Weight Elastomers Bearing Reactive Functional Groups*, American Chemical Society, 1989, vol. 222, pp. 415–423.
Dusek, Karel, et al., *The Toughening of Epoxy Resins with Reactive Polybutadienes*, American Chemical Society, 1984, vol. 208, pp. 27–35.

(Continued)

Primary Examiner—Bernard Lipman
(74) Attorney, Agent, or Firm—Whyte Hirschboeck Dudek SC (57) ABSTRACT

The invention relates to thermosetting compositions, in particular coating or molding compositions, comprising crosslinked polymer microparticles with a size ranging from 10 to 300 nm and carrying at least one reactive functional group which can react with at least one of the reactive components of the thermosetting composition. Preferably, these microparticles carry at least one second reactive functional group distinct from the first which can react with at least one other functional group of the same type carried by another microparticle and/or by a reactive component of the thermosetting composition. These microparticles are at least partially soluble, miscible and/or dispersible in the starting thermosetting composition. The preferred thermosetting compositions are based on resins of epoxy/amine type or on unsaturated polyester resins and/or on vinyl ester resins.

The coatings or molded items obtained exhibit very good mechanical, thermal and chemical strength resulting from the presence of these microparticles.

8 Claims, 1 Drawing Sheet

OTHER PUBLICATIONS

Williams, Robert J.J., et al., *Reaction–Induced Phase Separation in Modified Thermosetting Polymers*, Advances in Polymer Science, 1997, vol. 128, pp. 95–156.

Rozenberg, B.A., et al., *Network Formation Accompanied by Microphase Separation*, The Wiley Polymer Networks Group Review Series, 1998, vol. 1, pp. 209–217.

Girard–Reydet, E., et al., *Reaction–Induced Phase Separation Mechanisms in Modified Thermosets*, Polymer, 1998, vol. 39, No. 11, pp. 2269–2280.

Bucknall, C.B., et al., *Phase Separation in Crosslinked Resins Containing Polymeric Modifiers*, Polymer Engineering and Science, 1986, vol. 26, No. 1, pp. 54–62.

Mulhaupt, Rolf, *Flexibility or Toughness– The Design of Thermoset Toughening Agents*, Chimia, 1990, vol. 44, pp. 43–52.

Lin, King–Fu, et al., *Core–Shell Particles Designed for Toughening the Epoxy Resins. II. Core–Shell–Particle–Toughened Epoxy Resins*, Journal of Applied Polymer Science, 1998, vol. 70, pp. 2313–2322.

Maazouz, A., et al., *Toughening of Epoxy Networks Using Pre–formed Core–Shell Particles or Reactive Rubbers*, Polymer Bulletin, 1994, vol. 33, pp. 67–74.

\* cited by examiner

FIG. 1

THERMOSETTING RESIN COMPOSITIONS COMPRISING CROSS-LINKED REACTIVE MICROPARTICLES WITH IMPROVED MECHANICAL STRENGTH

The present invention relates to thermosetting compositions comprising reactive crosslinked polymer microparticles (CPMS) with a suitable composition and functionality to produce an improved performance of the final thermoset matrix in terms of mechanical, thermal and chemical strength. In particular in the case of fragile thermoset matrices for molding operations, the high mechanical strength can be reflected by a toughness represented by an improved cracking resistance or an improved impact strength, with a cracking resistance which can be multiplied threefold according to the nature and the level of these microparticles in these compositions, while maintaining a high mechanical modulus and a high glass transition temperature Tg.

In the case of thermoset coatings, the high mechanical strength corresponds to a good hardness/flexibility compromise, the hardness being able to be characterized by the resistance of the coating to penetration, in particular according to the indentation method, and the flexibility by the ability of the coating on the substrate to be deformed without cracking or detaching.

These thermosetting compositions, which can, for example, be based on resins of epoxy/amine, unsaturated polyester or vinyl ester type or on blends of unsaturated polyester/vinyl ester resins or on unsaturated polyester/polyurethane hybrid resins, have various applications in the fields of protective coatings, composites and molded components with high thermal, mechanical and chemical strength.

The improvement in the mechanical strength and more particularly in the toughness (cracking resistance or impact strength) of brittle materials still remains a problem to be solved, in particular in the case of thermoset materials, where, among other restrictions, it is necessary that neither their processing nor their performance in use, such as their hardness or modulus and thermal or chemical strength, in particular toward solvents, should be affected.

According to Polymer, 40, 1677–87, 1999, which describes the use of amorphous thermoplastics, and according to Polymer Int., 30, 11–16, 1993, liquid elastomers can be used in the thermoset matrix at concentrations which, according to "Toughened Plastics I", ACS—Advances in Chemistry Series, Washington, 233, 1993 and "Rubber Toughened Plastics", ACS—Advances in Chemistry Series, Washington, 222, 1989 or "Rubber modified thermoset resins", ACS—Adv. In Chemistry Series, Washington, 208, 1984, can vary from 2 to 50% by weight with respect to the reactive components. According to Olabisi et al. in "Polymer—Polymer Miscibility", Academic Press, NY, 1979, the hardness and the thermal performance decline when the agent for improving the mechanical toughness is soluble in the thermoset matrix.

Among the known methods, some use agents, miscible in the starting thermosetting precursor components, which result in a phase separation during the polymerization, as described in Adv. Polymer Sci., 128, 95–156, 1997 or Wiley Polymer Networks Group Review Series, 1 (16), 209–217, 1998 or Polymer, 39 (11), 2269–2280, 1998 or Polymer Engin. Sci., 26 (1), 54–62, 1986. Depending upon the level of agent for improving the toughness, the morphology can be either thermoplastic or elastomeric domains, the elastomers being of CTBN (Carboxy-Terminated Butadiene Nitrile Rubber) type, dispersed in the thermoset matrix, or vice versa, that is to say thermoset domains dispersed in the thermoplastic or elastomeric phase, or a bicontinuous morphology. In general, the toughness or the flexibility is improved only at the expense of other essential aspects of the performance, such as the chemical or thermal resistance and, the mechanical modulus or the hardness, depending upon whether it is a molding component or a coating. Another technique for improving the toughness consists of the incorporation of preformed thermoplastic particles, generally of the order of a micron (according to Chimia, 44, 43–52, 1990), but the same problem remains.

According to J. Applied Polymer Sci., 70, 2313–2322, 1998 or Polym. Bull., 33, 67–74, 1994, core/shell elastomer particles can also be used. In general, they are not reactive with respect to the matrix of epoxy/amine type but functional core/shell particles can be used according to J. Appl. Polym. Sci., 69, 2069–78, 1998 or J. Appl. Polym. Sci, 72, 849–858, 1999.

The essential problem to be solved with core/shell particles is the production of a homogeneous blend with the host thermosetting composition of epoxy/amine (or unsaturated polyester) type. In general, mixers with very high shear are needed with a complicated blending procedure.

The second problem encountered with core/shell particles is the high viscosity of the blend, which restricts its easy processing and more particularly restricts the wetting of the fillers and reinforcements or the correct filling of a mold for applications of composite type or limits its use for the application in the form of thin-layer protective coatings.

The present invention provides the solution to these problems by the use of reactive crosslinked polymer microparticles, with a structure and functionality which are suited to the host medium, for improving the mechanical strength, while maintaining high thermal and chemical strength. These microparticles, essentially based on acrylic monomers, optionally in the presence of other vinyl monomers, such as vinylaromatic monomers, are generally at least easily dispersible and/or at least partially soluble or miscible in the host thermosetting composition, with a low resulting viscosity.

A first subject matter of the invention relates to a thermosetting composition comprising crosslinked microparticles with a size of between 10 and 300 nm, with said microparticles carrying at least one reactive functional group which can react with at least one reactive functional group carried by at least one of the reactive components of the thermosetting composition.

More particularly, the invention relates to thermosetting compositions comprising microparticles carrying at least one second reactive functional group, distinct from the first, which can react with at least one other functional group of the same type carried by another microparticle and/or by at least one reactive component of the thermosetting composition.

The invention also relates to the use of the compositions of the invention in coatings and more particularly in protective coatings and more particularly still in protective coatings for electrical or electronic components, items or devices or for the manufacture of molded items or of items made of composite materials.

Another subject matter of the invention relates to thermoset matrices obtained from the thermosetting compositions of the invention.

A final subject matter of the invention relates to protective coatings or molded items or items made of composite materials obtained from the thermosetting compositions of the invention.

The thermosetting compositions comprising reactive crosslinked polymer microparticles as defined in the present invention can be based on any thermosetting composition. The definition of thermosetting comprises any single-component or two-component reactive system which can crosslink by the polycondensation and/or radical polymerization route and/or by a more specific polymerization route, passing from the state of a liquid or paste or solid powder with a soluble and/or fusible structure to the state of a solid with an infusible and insoluble structure. This definition comprises, inter alia, any composition which can crosslink by at least one polycondensation reaction or at least one radical polymerization reaction, preferably accelerated by a thermal effect. The term "thermoset matrix or coating" corresponds to the product obtained from the crosslinking of at least one thermosetting composition as defined above.

Mention may be made, as typical thermosetting compositions, without limitation, of the following reactive systems: epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene (DCPD) resin or reactive polyamides.

Each type of system may require a catalyst or a system which is specific for initiating the polymerization which is well known to a person skilled in the art. These thermosetting reactive systems can comprise several types of reactive components which can react with one another either directly by a condensation reaction after mixing the components, or after mixing and deblocking by heating a blocked reactive functional group carried by one of the components (for example, isocyanate blocked by phenol, reactive by heating above 100° C.), or by radical polymerization of ethylenically unsaturated functional groups by simple thermal initiation or in the presence of a radical initiation system which can comprise thermally decomposable initiators or initiators which can decompose under the effect of radiation or by more specific reaction and/or catalysis. Mention may be made, as example of a more specific reaction of an ethylenic unsaturation, of the Michael addition with an amine or an acid or a thiol. The preparation of these reactive systems as single- or two-component reactive systems, like their use as thermosetting compositions, are well known to a person skilled in the art, as described in "Introduction aux matériaux composites" [Introduction to composite materials], published by CNRS, 1983, Volume I. The presence in these systems of a reactive diluent of low molecular weight may be necessary for reasons of processing and/or of reactivity and/or of compatibility.

The reactive crosslinked microparticles present in the thermosetting compositions of the invention have a size ranging from 10 to 300 nm and preferably from 10 to 200 nm and carry at least one reactive functional group which reacts with at least one reactive component of the thermosetting composition so as to establish at least one type of chemical bond between a microparticle and the thermosetting resin. More preferably, these microparticles carry at least one second reactive functional group distinct from the first which can react with at least one other functional group of the same type carried by another microparticle and/or by at least one reactive component of the thermosetting composition. Thus, it is possible to have, in the host thermosetting compositions, two types of distinct and superimposed crosslinking reactions with the possibility of the formation of two superimposed networks simultaneously or in two separate stages. According to a specific case of the invention, the microparticles can carry at least one functional group which reacts by a polycondensation reaction and at least one second functional group which is an $\alpha,\beta$-ethylenic unsaturation which can polymerize by the radical route or which reacts by a more specific reaction mentioned above. It must also be specified that the microparticles as defined above can be present in the form of a mixture of microparticles having the characteristics defined above which can react with one another and with the reactive components of the host composition, with the mixed microparticles being able to be different in composition and/or with different reactive functional groups.

The microparticles used for the invention are preferably at least partially soluble or miscible and/or dispersible in the starting thermosetting resin composition. The term "soluble" is to be interpreted here as meaning a macroscopically homogeneous and transparent colloidal solution.

The commonest methods for the preparation of crosslinked microparticles are, first, emulsion polymerization in an aqueous medium and, secondly, dispersion polymerization in a nonaqueous medium of compositions comprising polymerizable compounds comprising, inter alia, a polymerizable compound as crosslinking agent. In both cases, the polymerization medium is not a solvent of the polymer formed, which precipitates in the form of polymer particles. It is this second method which is the preferred method for the preparation of the functionalized crosslinked microparticles of the present invention.

These microparticles are preferably prepared by polymerization in dispersion in a nonaqueous medium which is not a solvent of the polymer formed, starting from a composition comprising ethylenically unsaturated polymerizable compounds comprising:

at least one monomer A, comprising a single ethylenic unsaturation which can polymerize by the radical route, conferring, on the microparticles formed in said nonaqueous medium, self-stabilization during and after polymerization, without any addition of polymer having a role of stabilizing agent, either before or during or after polymerization, at least one compound B comprising at least two ethylenic unsaturations which can polymerize by the radical route, at least one compound C other than A or B and comprising at least one ethylenic unsaturation which can polymerize by the radical route and at least one second reactive functional group f1 other than an ethylenic unsaturation, and optionally at least one compound D, other than A, comprising a single ethylenic unsaturation which can polymerize by the radical route.

The monomers A, which confer self-stabilization as defined above on the microparticles formed, can be selected from monomers having only a single ethylenic unsaturation which can polymerize by the radical route, with a molecular mass $\overline{Mn}$ of less than 600 and preferably of less than 400, having a single polymerizable ethylenic unsaturation selected from (meth)acrylates, maleates or vinyls which is carried by a linear or branched aliphatic group or a mono- or polycyclic alicyclic group which may or may not be substituted, it being possible for the monomers optionally to carry at least one reactive functional group f2 other than the polymerizable ethylenic unsaturation. Generally, the stabilization role of the monomer A is related to the appropriateness of the solubility parameter of this monomer with respect to that of the polymerization medium and that of the polymer formed. The term "(meth)acrylate" is to be interpreted throughout as "acrylate and/or methacrylate".

The monomers A preferably have a chemical structure corresponding to the following general formula (I):

$$CH_2=CR_1-X-(R_2-Y)_k-R \qquad (I)$$

with $R_1$=H or $CH_3$,
X=ester —(C=O)O— or amide-(C=O)N($R_3$)—,
Y=ester —O(O=C)—, amide-($R_3$)N(C=O)— or urethane —O(O=C)NH—,
$R_2$=$C_2$–$C_6$ alkylene radical, which can be substituted by functional groups, such as OH, like, for example, a radical resulting from the opening of the epoxy ring of a glycidyl ether,
$R_3$=$C_1$–$C_6$ alkyl or. H,
k=0 or 1,
R=linear or branched $C_8$–$C_{22}$ alkyl or alkenyl radical or aralkyl radical substituted on the aromatic ring with a $C_8$–$C_{22}$ group or substituted or unsubstituted $C_6$–$C_{22}$ mono- or polycyclic radical, which can comprise an f2 reactive functional group selected from: carboxylic acid or anhydride, hydroxyl, epoxy, blocked or free isocyanate, or silane.

The preferred monomers A of the formula (I) correspond to R chosen from: isobornyl, lauryl, octadecyl, isodecyl, tridecyl, docosanyl, dicyclopentadienyl, cyclohexyl or a $C_8$–$C_{22}$ alkyl or cycloaliphatic group carrying a carboxylic acid or anhydride, hydroxyl or epoxy, blocked or free isocyanate, or silane reactive functional group f2. Mention may be made, as examples of monomers A carrying a carboxylic acid functional group f2, of mono(meth)acrylated derivatives of succinic anhydride substituted by a linear or branched $C_6$–$C_{22}$, preferably $C_6$–$C_{18}$, alkyl or alkenyl obtained by reaction of the alkyl- or alkenyl-substituted anhydride with a hydroxyalkyl (meth)acrylate with a $C_2$–$C_6$ and preferably $C_2$ or $C_3$ hydroxyalkyl group. Mention may be made, as examples of monomer A carrying a hydroxyl functional group f2, of mono(meth)acrylated derivatives of hydroxystearic acid obtained by reaction of hydroxystearic acid with glycidyl methacrylate or Cardura E10 (meth) acrylate. An epoxy functional group f2 can be introduced, for example, with epoxide-comprising dicyclopentadiene (meth)acrylate, epoxide-comprising vinylnorbornene (meth) acrylate, or (meth)acrylates comprising a cycloaliphatic epoxy as disclosed in WO 98/28286, or an epoxide-comprising unsaturated fatty acid (meth)acrylate. An f2 functional group can be introduced with a mono(meth) acrylate derived from the reaction between a $C_6$–$C_{12}$ cycloaliphatic or aliphatic diisocyanate and a hydroxyalkyl (meth)acrylate with a $C_2$–$C_6$ alkyl.

The molar level of the monomers A in the final microparticles obtained can vary from 5% to 99%, first depending upon the nature of the monomer A and secondly depending upon the role fulfilled, either as simple stabilization monomer for a variable composition based on compounds A, B, C and optionally D or as both stabilization monomer and predominant base component of the targeted microparticles. Consequently, the molar percentage will only be limited by the desired performance of the microparticles to be obtained. Generally, the self-stabilizing effect is sufficient within the range from 5 to 80 mol % and according to the monomer A chosen. By the definition of their technical role, the monomers A have the specific characteristic of being preferably attached to the outer layer of the microparticles and more specifically to the surface of the latter. This point is important in particular in the case where the monomer A carries a reactive functional group f2 as defined above. This is because, in this case, the specific characteristic of the monomer A allows it to attach the reactive functional group f2 specifically at the surface of the microparticle, thus improving even more significantly its accessibility and its overall reactivity with respect to the same functional groups contributed by the compounds C carrying f1 functional groups, which f1 functional groups are found distributed randomly throughout the volume of the microparticle, with an accessibility of the functional groups which is relatively more difficult at the core of the microparticle than at the surface. If more than one monomer A carrying f2 functional groups is used, the various f2 functional groups must react neither with one another nor with the f1 functional groups of the compounds C during the polymerization.

The compounds B carry at least two ethylenic unsaturations and act as crosslinking agent for the microparticles formed. B is an essential component of the composition of the polymerizable compounds. These are essentially ethylenically multifunctional monomers and/or oligomers with a functionality of at least 2 with regard to unsaturations which can be polymerized by the radical route. In the case of monomers, the functionality as defined above can preferably vary from 2 to 6. Mention may be made, as examples of such monomers, of: ethylene glycol, propylene glycol, butanediol, 2-methylpropanediol, neopentyl glycol, hexanediol, zinc and/or calcium di(meth)acrylates or substituted or unsubstituted divinylbenzenes, glycerol or trimethylolpropane tri(meth)acrylates and/or alkoxylated derivatives, pentaerythritol tri- or tetra(meth)acrylates and dipentaerythritol penta- or hexa(meth)acrylates. The multifunctional oligomers have a functionality which can range from 2 to 50 and preferably from 2 to 20 and a molecular mass $\overline{Mn}$ of less than 2 500, preferably of less than 1 500. The functionality and $\overline{Mn}$ are fixed according to the desired crosslinking density. The lower the value of $\overline{Mn}$ and the higher the functionality, the higher the crosslinking density of the microparticles. Mention may be made, as examples of such oligomers, of (meth)acrylic esters of polyol oligomers based on polyethers, comprising ether units chosen from oxyethylene and/or oxypropylene and/or oxytetramethylene, or based on saturated polyesters, or based on polyurethanes or unsaturated polyesters, or (meth)acrylated acrylic oligomers which can be obtained, for example, either by (meth) acrylation of (meth)acrylic copolymers based on glycidyl methacrylate by (meth)acrylic acid or by (meth)acrylation of (meth)acrylic copolymers based on (meth)acrylic acid by glycidyl methacrylate.

The molar level of the compound B can vary from 0.02% to 30% and preferably between 0.5% and 15%. The limitation of this level is important as, above a limit value, the probability of chemical bonding between microparticles becomes high with, as a consequence, a significant risk of destabilization, agglomeration and sedimentation of the microparticles.

The compounds D are monomers other than the monomers A as defined above and/or oligomers comprising a single ethylenic unsaturation which can polymerize by the radical route and are components for adjusting the base composition according to the properties targeted for the microparticles, which can vary and can be adjusted according to each specific application. They are preferably selected from. (meth)acrylic monomers, such as methyl, ethyl, propyl, butyl, tert-butyl, 2-ethylhexyl or 2-(2-ethoxyethoxy) ethyl (meth)acrylates, or vinylaromatic monomers, such as styrene or vinyltoluenes, or vinyl esters, such as vinyl acetate, or (meth)acrylated oligomers with an $\overline{Mn}$ of less than 2 500 and more particularly of less than 1 500, such as (meth)acrylates of monohydroxylated oligomers. The preferred (meth)acrylates of oligomers are the (meth)acrylates of polyalkoxylated monoalcohols, comprising alkoxy units chosen from oxyethylene and/or oxypropylene and/or oxytetramethylene, or (meth)acrylates derived from monoalcohols based on polycaprolactone, or on polyesters or on polyurethanes. The presence of these compounds is optional, according to the structure and the performance which are desired for the microparticles to be obtained. Monomers or oligomers of this type can adjust the mechanical performance of the microparticles in terms of hardness or flexibility of the core of the particle according to the corresponding glass transition temperatures Tg. For example, the use of a monomer which gives a polymer with a low Tg, such as butyl acrylate, makes it possible to obtain, according to the adjusted proportions, microparticles with a predominant soft nature with a relatively low Tg. This type of structure is particularly advantageous in rendering flexible a hard matrix or in the search for a hardness/flexibility compromise for applications in molding compositions or coatings, in particular thermosetting ones, which is the subject matter of the present invention. Their molar level can vary from 0 to 80% according to the structure desired for the final microparticle.

The compounds C are monomers other than A and/or oligomers other than B or D carrying at least one ethylenic unsaturation which can polymerize by the radical route and at least one second reactive functional group f1 other than the ethylenic unsaturation. These functionalized monomers or oligomers carry reactive functional groups f1 selected from: carboxylic acid or anhydride, hydroxyl, epoxy, blocked or free isocyanate, silane, amine or oxazoline. Without limitation, the following examples of possible compounds C may be mentioned:

- in the case where the f1 functional group is a carboxylic acid: (meth)acrylic, maleic, fumaric or itaconic acid,
- in the case where f1 is an anhydride functional group: maleic or itaconic anhydride,
- in the case where f1 is a hydroxyl: hydroxyalkyl (meth)acrylates with a $C_2$–$C_4$ hydroxyalkyl, such as hydroxyethyl, hydroxypropyl or hydroxybutyl, or mono(meth)acrylates of polycaprolactone or of diols, such as: polyetherdiols comprising ether units chosen from oxyethylene and/or oxypropylene and/or oxytetramethylene, polyesterdiols or polyurethanediols, with an $\overline{Mn}$ of less than 2 500 and preferably of less than 1 500,
- in the case where f1 is an epoxy functional group: glycidyl methacrylate or an alkoxylated glycidyl (meth)acrylate as disclosed in WO 98/28287,
- in the case where the f1 functional group is an isocyanate: isocyanatoethyl (meth)acrylate or the mono(meth)acrylate of a urethane isocyanate derived from the condensation of a $C_2$–$C_6$ hydroxyalkyl (meth)acrylate with an aromatic diisocyanate, such as diisocyanatotoluene (TDI),
- in the case where f1 is a silane functional group, the latter can be used in the trialkyl- or trialkoxysilane form carried by a (meth)acrylic monomer or oligomer derivative,
- in the case where f1 is an amine functional group: tert-butylaminoethyl methacrylate or dimethylaminoethyl methacrylate,
- in the case where f1 is an oxazoline functional group: oxazoline (meth)acrylates and more particularly 2-(5-methacryloylpentyl)-1,3-oxazoline.

Generally, the f1 functional groups carried by at least one compound C can be different but they must not react with one another or with possible f2 functional groups carried by monomers A during the polymerization.

The choice of the compound C, of its reactive functional group and of its molar level will depend essentially on the applicational reactive system and on the composition and functionality of the latter. The molar level can thus vary up to 80% for highly reactive microparticles.

It is obvious to a person skilled in the art that these functional groups must not interact with the polymerization medium in order for these reactive functional groups to be preserved. One means of preserving the f1 functional groups capable of interacting with the polymerization medium is the blocking of the f1 functional group by a blocking agent with possible deblocking of f1 after polymerization, in the same context as a chemical modification of the f1 functional groups after the polymerization stage. Such a preventive blocking and subsequent deblocking is well known to a person skilled in the art.

The f1 functional groups carried initially by the compound C and/or the f2 functional groups optionally carried by the monomer A can be modified, after polymerization, to respective functional groups f3 and f4 by chemical reaction in one or more stages with the appropriate reactants. For example, the introduction of a (meth)acrylate final functional group f4 can be carried out either from an epoxy functional group f1, by reaction with (meth)acrylic acid, or from a carboxylic acid functional group f1, by reaction with glycidyl (meth)acrylate or hydroxyethyl (meth)acrylate.

The latter reactions can also be used to introduce, specifically at the surface of the microparticle, (meth)acrylic functional groups f3 from f2 precursor functional groups, as already described for the f1 precursor functional groups.

The microparticles of the invention can also be obtained, without limitation of the process used, by polymerization of a composition comprising ethylenically unsaturated polymerizable compounds composed of:

- a first component A' which represents from 50 to 99 mol % of said composition comprising polymerizable compounds and which is composed of isobornyl and/or norbornyl and/or cyclohexyl and/or lauryl and/or tridecyl and/or octadecyl and/or Cardura E10 (meth)acrylate, optionally in combination with a $C_2$–$C_8$ alkyl (meth)acrylate,
- a second component B' composed of at least one monomer or oligomer comprising at least two ethylenic unsaturations which can polymerize by the radical route,
- a third component C' composed of at least one monomer or oligomer comprising, in addition to an ethylenic unsaturation which can polymerize by the radical route, at least one second reactive functional group f1' other than the ethylenic unsaturation, with the possibility of at least partial chemical modification of the f1' starting functional groups to f2' final functional groups, provided that the f1' functional groups selected do not react with one another during the polymerization and provided that the sum of the three polymerizable components A'+B'+C' is equal to 100 mol %. More preferably, these microparticles carry f1' functional groups, contributed by the third component C', selected from: epoxy, hydroxyl, carboxyl, carboxylic anhydride, isocyanate, silane, amine or oxazoline, and, if appropriate, f1' functional groups at least partially modified to f2' functional groups selected from: (meth)acrylates, vinyls, maleates, maleimides, itaconates, allyl alcohol esters, dicyclopentadiene-based unsaturations, unsaturated $C_{12}$–$C_{22}$ fatty esters or amides, carboxylic acid salts or quaternary ammonium salts. These microparticles are preferably obtained by polymerization of the composition of the polymerizable compounds A', B' and C', in dispersion in a nonaqueous medium which is not a solvent of the polymer and in the absence of any stabilizing polymer added at the start or during or after polymerization, according to the process described above. The component B' can be composed of compounds as described for the compound B and, likewise, the component C' can be composed of compounds as already described above for the compound C.

Both the composition and the functionality of the microparticles used in the thermosetting compositions of the present invention can be adjusted according to the starting host thermosetting composition. For example, the composition and the functionality are adjusted in order to have good compatibility and/or at least homogeneous dispersion of the reactive microparticles in the starting host composition. Furthermore, at least a portion of the reactive functional groups carried by these microparticles are identical and/or react with those carried by the thermosetting reactive components. More particularly, the structure of the microparticles is adjusted to the effect desired in terms of hardness/flexibility compromise. In the case of precursor compositions for thermoset matrices with a high hardness or modulus and/or Tg and with an insufficient flexibility, to be improved either in terms of coefficient $K_{1c}$ and/or of impact strength, the preferred microparticles will have glass transition temperatures Tg generally of less than 60° C. and preferably with a Tg of less than 30° C. and more preferably between −50 and 20° C.

Generally, the level of the reactive microparticles depends on the desired improvement, on the host thermoset matrix to be reinforced and/or rendered flexible and the reactive functional groups carried. This level can lie between 0.5 and 50% by weight of the overall organic thermoset matrix (of thermosetting organic reactive components+microparticles) and preferably from 2 to 35% and more preferably still from 5 to 25% by weight of the overall organic thermoset matrix.

A specific case of thermoset matrices requiring an improvement in the hardness/flexibility compromise is the case of thermoset matrices of epoxy/amine type. In this specific context, the thermosetting compositions of epoxy/amine type provided by the invention comprise:

a) at least one epoxide-comprising compound, having a functionality with regard to epoxy groups of at least two, with an aromatic and/or (cyclo)aliphatic structure,
b) at least one amine compound, with an amine functionality of at least two, with an aromatic and/or (cyclo)aliphatic structure,
c) if appropriate, a monofunctional epoxide compound carrying a second distinct functional group which can polymerize by the radical route.

These compositions comprise, in addition to the components a), b) and, if appropriate, c) mentioned above:

d) 0.5–50% by weight with respect to a)+b)+c)+d) of reactive crosslinked microparticles.

The reactive crosslinked microparticles preferred for the compositions based on epoxy/amine carry at least one epoxy or carboxylic acid or anhydride functional group. These microparticles can be obtained by polymerization starting from a composition comprising:

i) 10–50 mol % of lauryl and/or tridecyl and/or octadecyl and/or docosyl and/or isobornyl and/or Cardura E10 (meth)acrylate,
ii) 10–70 mol % of butyl and/or tert-butyl and/or 2-ethylhexyl and/or 2-(2-ethoxyethoxy)ethyl (meth)acrylate,
iii) 5–30 mol %:
  of glycidyl methacrylate and/or of at least one (meth)acrylate carrying at least one epoxide functional group derived from dicyclopentadiene or from vinylnorbornene or from cyclohexene and/or of alkoxylated glycidyl ether (meth)acrylates, for one epoxy functional group,
  of (meth)acrylic acid and/or of maleic or fumaric or itaconic acid and/or of maleic anhydride, for one carboxylic acid or anhydride functional group,
iv) 2–10 mol % of hexanediol and/or neopentyl glycol and/or trimethylolpropane di(meth)acrylate, with the proportions of the components selected in such a way that the sum of the molar percentages of i)+ii)+iii)+iv) is equal to 100, and with the additional possibility, during a second stage, of at least partially modifying the starting reactive functional groups described above to a second reactive functional group according to:
  the epoxy functional groups: by reaction with (meth)acrylic acid,
  the acid (carboxyl) and/or anhydride functional groups: by reaction with glycidyl methacrylate or vinyl or allyl alcohol or a hydroxyalkyl (meth)acrylate.

The partial modification of these microparticles can thus result in thermosetting compositions of epoxy/amine type comprising microparticles as described above with at least two distinct reactive functional groups, such as:
  epoxy in the presence of: (meth)acrylate,
  carboxylic acid and/or anhydride in the presence of: (meth)acrylate or allyl or vinyl.

The epoxy/amine compositions as described above comprising reactive crosslinked microparticles carrying at least one ethylenic unsaturation functional group which can polymerize by the radical route and at least one other functional group which preferably reacts with the epoxy functional groups of the thermosetting reactive components are more particularly preferred. The compositions of epoxy/amine type comprising reactive crosslinked microparticles with, as functional groups, carboxyl or anhydride functional groups in the presence of (meth)acrylate and/or allyl and/or vinyl functional groups are more specifically preferred.

To prepare these epoxy/amine compositions, the epoxide-comprising compounds with a functionality of at least two with regard to epoxy are selected from multifunctional epoxide-comprising monomers but also from epoxide-comprising resins composed of oligomers/polymers with an Mw ranging up to 20 000. As examples of epoxide-comprising compounds with an aromatic structure, mention may be made of bisphenol A diglycidyl ether (BADGE) and bisphenol F diglycidyl ether (BFDGE) derivatives which can be alkoxylated, preferably propoxylated and/or ethoxylated, with a number of alkoxy units between 1 and 10, or aliphatic derivatives, such as butanediol or propylene glycol diglycidyl ether, or resins of epoxide-comprising novolak type.

The preferred cycloaliphatic epoxide-comprising compounds include the multifunctional epoxide-comprising monomers based on epoxide-comprising cyclohexene derivatives as disclosed in WO 98/45349 and/or oligomers and/or polymers obtained from epoxide-comprising (meth)acrylates as disclosed in WO 98/28286 or WO 98/282287.

As regards the multifunctional epoxide-comprising compounds, they are preferably present as reactive diluent which regulates the viscosity and more preferably in the presence of epoxide-comprising oligomers and/or polymers. They carry a second functional group which reacts by radical polymerization, such as methacrylate. Preferred examples are GLYMA or epoxide-comprising (meth) acrylates based on epoxide-comprising dicyclopentadiene or on epoxide-comprising cyclohexene or on epoxide-comprising vinylnorbornene. In a more specific case, the reactive microparticles of the thermosetting composition can carry at least the same reactive functional groups as this multifunctional epoxide.

Mention may be made, among the amine components of the compositions of epoxy/amine type with a functionality of at least two, as examples, of the following: isophoronediamine, N-(aminoethyl)piperazine, 4,4-methylenebis(3-chloro-2,6-dimethylaniline), dicyanodiamide, 4,4'-diaminodiphenyl sulfone, 4,4'-diamino-3,3-dimethyldicyclohexylmethane, diethyltoluenediamine, m-methylxylenediamine, (poly)propylenediamine or (poly)propylenetriamine or Jeffamines®, or triethylenetetraamine.

In the case of thermosetting compositions based on unsaturated polyesters or on unsaturated polyesters modified by polyisocyanates, or on vinyl esters or on their blends, the reactive microparticles can carry, as preferred reactive functional groups, the following:

hydrogen maleate alone and/or (meth)acrylate with optionally residual hydroxyl functional groups, in particular in the case of polyesters modified by polyisocyanates, by optionally partial modification of starting hydroxyl functional groups respectively by maleic anhydride and/or (meth)acrylic acid, carboxylic anhydride and acid alone and/or (meth)acrylate by optionally partial modification of starting anhydride or acid functional groups by a hydroxyl (meth)acrylate or glycidyl methacrylate.

According to another specific case of the invention, the thermosetting composition is based on unsaturated polyesters and/or on unsaturated polyesters modified by polyisocyanates and/or on vinyl esters. In this case, it can comprise:

at least one unsaturated polyester and/or at least one unsaturated polyester modified by a polyisocyanate and/or at least one vinyl ester, at least one copolymerizable comonomer carrying at least one α,β-ethylenic unsaturation chosen from vinylaromatic and/or (meth)acrylic and/or allyl monomers, optionally at least one second monomer carrying at least two reactive functional groups, one of which can polymerize by the radical route and the other by a condensation reaction, 0.5–50% and preferably from 5 to 20% by weight of reactive crosslinked microparticles, which can be obtained by polymerization starting from:
10–40 mol % of Cardura E10 (meth)acrylate,
10–75 mol % of butyl and/or tert-butyl and/or 2-ethylhexyl and/or 2-(2-ethoxyethoxy)ethyl (meth) acrylate and of styrene, with a molar ratio of styrene to (meth)acrylic monomers which can vary from 0 to 0.2,
5–40 mol % of hydroxyethyl (meth)acrylate or of maleic anhydride or of (meth)acrylic acid or of glycidyl methacrylate,
2–10 mol % of hexanediol and/or propylene glycol and/or neopentyl glycol and/or trimethylolpropane (meth)acrylate,
with the sum of the molar percentages of these constituents being equal to 100.

These compositions also comprise a radical initiating system which a person skilled in the art knows how to adjust according to the applicational conditions.

The starting reactive functional groups of these microparticles are preferably at least partially modified:
the starting hydroxyl functional groups to hydrogen maleates by reaction with maleic anhydride and/or to (meth) acrylates by reaction with (meth)acrylic acid,
the starting epoxy functional groups to (meth)acrylates by reaction with (meth)acrylic acid,
the carboxylic acid functional groups to methacrylate by reaction with glycidyl methacrylate,
the anhydride functional groups to (meth)acrylates and residual acids by reaction with a hydroxyethyl or hydroxypropyl (meth)acrylate.

The unsaturated polyesters which can be used for the abovementioned compositions can be selected from the unsaturated polyesters obtained by polycondensation:
of an unsaturated anhydride or diacid, such as maleic anhydride and its condensation derivatives with dicyclopentadiene (DCPD), maleic acid and/or fumaric acid, optionally in the presence of at least one saturated anhydride or diacid, such as o-, iso- or terephthalic or tetrabromoterephthalic or adipic anhydride or diacid, with
a polyol, such as ethylene glycol, propylene glycol, diethylene glycol, neopentyl glycol, dipropylene glycol, 2-methylpropanediol, butanediol, hydrogenated bisphenol and derivatives, trimethylolpropane or trimethylpentanediol,
with a hydroxyl and/or carboxyl functionality and corresponding $I_{OH}$ indices of 50 to 250 and $I_{CO2H}$ indices of 50 to 250, optionally modified by DCPD or by an aromatic polyisocyanate with a functionality of at least two, such as methylenedi(phenyl isocyanate), or a cycloaliphatic polyisocyanate with a functionality of at least two, such as isophorone diisocyanate. The unsaturated polyester composition which can be used can also be one comprising at least one unsaturated polyesterether as disclosed in EP 930 327. The composition comprising modified or unmodified unsaturated polyesters can comprise from 20 to 50% and preferably from 25 to 40% by weight of at least one comonomer as reactive diluent which can be selected from: styrene, α-methylstyrene, o-, m- or p-vinyltoluene, divinylbenzenes, diallyl phthalate or a multifunctional acrylic monomer. In the case of unsaturated polyesters carrying carboxyl functional groups or of polyesters modified by a polyisocyanate, the comonomer can comprise one of the epoxide-comprising (meth)acrylic monomers derived from the epoxidation of an alkoxylated allyl (meth)acrylate, which epoxidation is disclosed in WO 98/28287, or of dicyclopentadiene or vinylnorbornene (meth)acrylate. The radical crosslinking initiating system can be based on a peroxide, such as methyl ethyl ketone peroxide or benzoyl peroxide, under conditions known to a person skilled in the art.

In the case of compositions based on or comprising vinyl ester resins, the latter can be resins known to a person skilled in the art, such as (meth)acrylates of bisphenol A glycidyl ether and of its alkoxylated derivatives or of epoxide-comprising novolak resins. The same comonomers can be used as reactive diluent as for the unsaturated polyesters. The same system for initiating the radical crosslinking can be used as for the unsaturated polyesters. The presence of residual hydroxyl functional groups (resulting from the opening of the epoxy) or epoxy functional groups which are partially esterified can make possible a double crosslinking reaction with reactive crosslinked microparticles carrying polymerizable unsaturations, such as maleate and/or (meth) acrylate, and a second functional group, such as anhydride, carboxyl or isocyanate.

The thermosetting compositions as defined by the present invention are used as coating and/or molding compositions as they are or can be used as a base for the preparation of coating and/or molding compositions and of composites by possible addition of other additives and adjuvants or reinforcements, such as crosslinking catalysts or initiators, pigments, inorganic fillers, rheological additives or organic or inorganic reinforcements, such as organic fibers or glass fibers or beads, well known to and commonly used by a person skilled in the art for such applications. An additional advantage of the presence of the microparticles as defined in the compositions of the present invention is the possibility of better control of the rheology of these compositions, even at higher levels of dispersed additives and fillers, such as pigments, inorganic fillers or reinforcements.

Thus, the thermosetting compositions of the invention can be used for the preparation of coatings for mechanical and/or thermal and/or chemical protection and more particularly for the protection of electrical items or devices or electronic items requiring both high mechanical strength and high thermal and chemical stability.

The following examples may illustrate the present invention without any limitation on the choice of the parameters described.

EXAMPLE 1

CPMs of Epoxy Functionality

Molar composition of polymerizable compounds:
Octadecyl acrylate: 30 mol %
Butyl acrylate: 52 mol %
Glycidyl methacrylate: 13 mol %
Hexanediol diacrylate: 5 mol %.

The crosslinked polymer microparticles (CPMs) are synthesized by a batchwise radical polymerization process in nonaqueous dispersion according to the following conditions:

94 g of n-heptane and 94 g of 2-propanol are introduced into a 500-ml reactor equipped with a reflux condenser and a mechanical stirrer under a light nitrogen flow.

The temperature is brought to 70° C. The following mixture of (polymerizable) monomers is charged to the reactor:
Octadecyl acrylate: 31.4 g
Butyl acrylate: 21.5 g
Glycidyl methacrylate: 6.0 g
Hexanediol diacrylate: 3.7 g The temperature is stabilized at 70° C. and 0.52 g of azobisisobutyronitrile (AIBN) is introduced into a reactor, i.e. 10 mmol/l with respect to the monomers. The dispersion is of low viscosity through the duration of the synthesis. After reacting for 5 h, the conversion of the monomers is greater than 95%, from the monitoring of the monomers by size exclusion chromatography (SEC) and by the measurement of the level of solids in the solution. The CPMs are isolated by distillation of the synthesis solvents. The reflux condenser is replaced by a distillation column and the temperature of the dispersion is gradually increased up to 105° C. The CPMs are subsequently dried under vacuum (20 mbar) to remove any trace of residual solvent. The dried CPMs have the appearance of a sticky wax at ambient temperature. The radius of gyration, measured by multiangle laser light scattering (reference Dawn Wyatt Technology at $\lambda$=632.8 nm) in THF, is of the order of 20 to 40 nm.

EXAMPLE 2

CPMs with Double Functionality: Epoxy and Acrylate

These CPMs are synthesized by partial acrylation of the CPMs of example 1. The epoxide groups of the CPMs of example 1 are modified by reaction with acrylic acid (AA) at 100° C. in the presence of 0.8% by weight of chromium (III) diisopropylsalicylate (CrDIPS), used as catalyst, and 0.3% by weight of hydroquinone, to avoid any radical polymerization of the acrylic functional groups introduced. The chemical modification is carried out in solution at 50% by weight in toluene in a 250-ml reactor equipped with a reflux condenser under a light nitrogen flow.

The acrylic acid is gradually added, so as to obtain the final [epoxy]/[acid] molar ratio of 1.83. At the end of the reaction, the CPMs are obtained with a double functionality, [epoxy]=0.44×10–3 mol·g$^{-1}$ and [C=C] (acrylate)=0.25× 10–3 mol·g$^{-1}$. The solvent is evaporated under vacuum (20 mbar) at ambient temperature.

EXAMPLE 3

CPMs of Acid (Carboxyl) Functionality

Preparation according to the process described in example 1, starting from the following composition of polymerizable compounds:
Octadecyl acrylate: 32.5 g (30 mol %)
Butyl acrylate: 22.3 g (52 mol %)
Acrylic acid: 4.1 g (13 mol %)
Hexanediol diacrylate: 3.8 g (5 mol %)

Appearance of the final CPMs obtained: sticky wax at ambient temperature.

EXAMPLE 4

CPMs of Acid (Carboxyl) Functionality

Preparation according to the process of example 1, starting from the following composition of polymerizable compounds:
Lauryl acrylate: 26.6 g (30 mol %)
Isobornyl acrylate: 7.6 g (10 mol %)
Butyl acrylate: 19 g (40 mol %)
Acrylic acid: 5.2 g (15 mol %)
Hexanediol diacrylate: 4.2 g (5 mol %)

Appearance: viscous liquid at ambient temperature, completely amorphous.

EXAMPLE 5

CPMs with Double Functionality: Acid (Carboxyl) and Methacrylate

The preparation is carried out by partial methacrylation of the acid (carboxyl) functional groups of the CPMs of example 4 with glycidyl methacrylate (GLYMA) according to a procedure similar to that of example 2: reaction in solution, at 50% in toluene, at 100° C. under a nitrogen flow in the presence of CrDIPS as described in example 2. The amount of GLYMA is adjusted for an initial [epoxy]/[acid] molar ratio of 1.62. At the end, the CPMs carry the double functionality, acid [COOH]=0.34×10$^{-3}$ mol·g$^{-1}$ and methacrylate [C=C]=0.55×10$^{-3}$ mol·g$^{-1}$.

EXAMPLE 6

CPMs with Acid (Carboxyl) Functionality

These CPMs are prepared according to the process described in example 1, starting from the following composition of polymerizable compounds:
Cardura E10 acrylate (Cardura E10 being a branched aliphatic glycidyl ether sold by Shell): 23.4 g (20 mol %)
Butyl acrylate: 27.5 (55 mol %)

Acrylic acid: 7.3 g (20 mol %)
Hexanediol diacrylate: 4.4 g (5 mol %)

Appearance: completely amorphous viscous liquid at ambient temperature.

EXAMPLE 7

CPMs with Double Functionality: Acid (Carboxyl) and Methacrylate

The preparation is carried out as for example 5 by partial methacrylation of the acid (carboxyl) functional groups carried by the CPMs of example 6 with glycidyl methacrylate. The GLYMA is introduced so that [epoxy]/[acid]=0.33.

EXAMPLE 8

Nonfunctionalized CPMs

These CPMs are prepared according to the process of example 1, starting from:
Octadecyl acrylate: 30.4 g (30 mol %)
Butyl acrylate: 20.8 g (65 mol %)
Hexanediol diacrylate: 3.5 g (5 mol %)

Appearance of the final CPMs: sticky wax at ambient temperature.

EXAMPLE 9

Hydroxylated CPMs

Preparation according to the process described in example 1, starting from the following composition:
Cardura E10 acrylate: 22.6 g (20 mol %)
Butyl acrylate: 26.52 g (55 mol %)
2-hydroxyethyl acrylate: 8.35 g (20 mol %)
Hexanediol diacrylate: 4.26 g (5 mol %)

Appearance of the dried CPMs: viscous and transparent liquid at ambient temperature.

Other characteristics: radius of gyration (according to the method described above) of 30 nm and $\overline{Mw}$ of 260 000 g·mol$^{-1}$.

EXAMPLE 10

CPMs of Example 9 Modified with Maleic Anhydride (MA)

The reaction for modifying the CPMs of example 9 with MA is carried out in a 250-ml reactor equipped with a reflux condenser under a light nitrogen flow, at 75% in toluene, at 100° C. and for 6 hours, in the presence of 0.5% by weight of sodium acetate, as catalyst, and of 0.1% by weight of hydroquinone (HQ), in order to avoid any radical polymerization of the maleates. The amount of MA is adjusted in order to have an OH/MA molar ratio of 1. CPMs of double functionality: maleate/acid (carboxyl) with the same concentration equal to $1.23 \times 10^{-3}$ mol·g$^{-1}$, are obtained at the end of the reaction. The solvent is removed by evaporation under vacuum at 20 mbar at ambient temperature.

EXAMPLE 11

Thermosetting Epoxy/Amine Molding Composition (Comparative Reference)

149.6 g of bisphenol A diglycidyl ether (BADGE, n=0.15, under the D.E.R. 340 reference of Dow Chemical) are mixed with 150.3 g of 4,4'-methylenebis(3-chloro-2,6-diethylaniline) (MCDEA, under Lonzacure reference of Lonza) at 135° C. for 3 min. The mixture is cast into a metal mold (34×34 cm$^2$) covered with Teflon-treated fabric and placed in an oven at 135° C. The polycondensation reaction is continued for 14 h, followed by postcuring for 4 h at 190° C. After returning to ambient temperature, the plaque with a thickness of 6 mm is removed from the mold and analyzed. The material is characterized by a $K_{1c}$ parameter of 0.6 MPa·m$^{0.5}$, measured in three-point bending according to ISO Standard 13586, and a dynamic mechanical transition temperature $T_{\alpha at}$ 1 Hz of 183° C. (associated with the glass transition), measured by dynamic mechanical spectroscopy on a model RDA II device from Rheometrics Scientific, with $T_\alpha$ corresponding to the temperature of the tan δ maximum.

EXAMPLE 12

Molding composition+CPMs According to Examples 1, 2 and 8 (According to the Invention)

The CPMs are added at 14.3% by weight with respect to the total weight of the composition:

42.9 g of CPMs
128.2 g of BADGE
128.8 g of MCDEA

The CPMs and BADGE are first of all mixed at 135° C., then the amine is added and the polymerization takes place according to the conditions specified in example 11. The results are presented in the comparative table below.

Comparative table of the results

| | BADGE/MCDEA according to ex. 11 (comparative) | Unreactive CPMs of ex. 8 (comparative) | Epoxy CPMs of ex. 1 (see ex. 12) according to the invention | Epoxy and acrylate CPMs of ex. 2 (see ex. 12) according to the invention |
|---|---|---|---|---|
| $K_{1c}$ (MPa·m$^{0.5}$) | 0.60 | 0.67 | 0.79 | 0.86 |
| $T_\alpha$ (° C.) | 183 | 165 | 167 | 183 |

These results demonstrate that significantly better results are obtained with the CPMs carrying at least one (epoxy) functional group which reacts with the thermosetting composition and preferably at least two distinct functional groups, one of which (epoxy) reacts with the themosetting composition and the other of which (acrylate) can polymerize by the radical route (thermal route).

EXAMPLE 13

BADGE/MCDEA Molding Composition with a Variable Level of CPMs of Example 5: Double Acid+Methacrylate Functional Group Same preparation conditions as in example 10 except with the CPMs of example 5, at a level which can vary between 0 and 22.1% by weight.

| Results | | | | | |
|---|---|---|---|---|---|
| CPMs according to ex. 5 (% by mass) | 0 | 3.4 | 6.9 | 14.3 | 22.1 |
| $K_{1c}$ (MPa · m$^{0.5}$) | 0.60 | 1.08 | 0.96 | 1.71 | 1.77 |
| $T_\alpha$ (° C.) | 183 | 176 | 173 | 170 | 164 |
| $G'_r$ (MPa)* | 11.2 | 7.1 | 6.7 | 6.3 | 5.6 |

Figure 1:
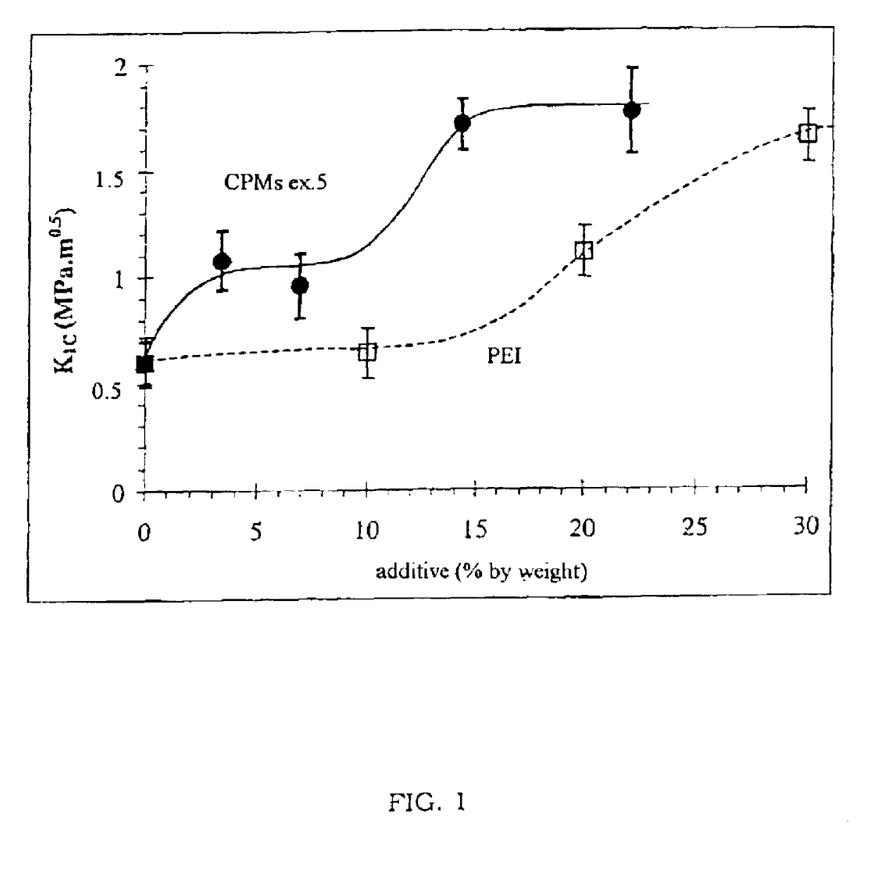

*$G'_r$ is the shear storage modulus at the rubbery plateau, measured in torsion by dynamic spectroscopy at 1 Hz on an RDA II These results demonstrate an improvement of nearly 300% in $K_{1c}$ of the thermoset matrix for levels of CPMs from 14.3% by weight. The $K_{1c}$ results obtained for the same matrix are compared in FIG. 1 as a function of the level of additive, on the one hand, with the CPMs of the present invention and, on the other hand, with a polyetherimide (PEI), the results with the PEI being cited by A. Bonnet in his thesis at the Lyons INSA of 1999. The comparison shows that, in addition to the disadvantages of the thermoplastic additives already mentioned, at least twice the level of thermoplastic additive (PEI) would be necessary to achieve an equivalent $K_{1c}$ performance. This is because the performance achieved for 30% by weight of PEI is already achieved with less than 15% by weight of CPMs of example 5.

EXAMPLE 14

Molding Composition Based on Vinyl Esters
(Comparative Reference)

195 g of a bisphenol A diglycidyl ether dimethacrylate (sold by Cray Valley under the reference Craynor CN 151) are mixed with 105 g of styrene at ambient temperature. After obtaining a homogeneous mixture with a viscosity of 0.12 Pa·s at 25° C., the composition is polymerized by addition and mixing, at ambient temperature, of 1% by weight of methyl ethyl ketone peroxide, Peroximon K12 from Atochem, and 2% by weight of an accelerator composed of a mixture of cobalt octoate and of dimethylaniline in proportions by weight equal to 40% by weight in solution in styrene. The composition is subsequently molded in a pregreased glass mold. The reaction is continued at ambient temperature for 14 hours, followed by postcuring for 1 hour at 120° C. After cooling, the plaque is removed from the mold and characterized with the following characteristics obtained: $K_{1c}$=0.77 MPa·m$^{0.5}$ according to ISO 13586, transition temperature $T_\alpha$, by dynamic mechanical measurement at 1 Hz, of 142° C., Young's modulus of 3.2 GPa, measured in three-point bending, and Charpy impact strength, according to ISO 179, equal to 8.86 kJ·m$^2$.

EXAMPLE 15

Molding Composition Based on Vinyl Esters and on Reactive CPMs of Example 10

The reactive CPMs obtained according to example 10 are added at a level of 9.75% by weight with respect to the total weight of the composition.
Composition used:
29.25 g of CPMs of example 10 (hydrogen maleate functional groups)
165.75 g of CN 151
105 g of styrene
The CPMs are first mixed with the styrene and, subsequently, the resin CN 151 (CPMs+CN 151+styrene viscosity: 0.27 Pa·s at 25° C.), the initiator and catalyst are added, with a polymerization carried out as for example 14. The final material is characterized according to the same methods as the material of example 14, by:
$K_{1c}$=0.98 MPa·m$^{0.5}$
Transition temperature at 1 Hz of 130° C.
Young's modulus=2.7 GPa
Charpy impact strength=18.82 kJ·m$^{-2}$.

Compared with those of the material without CPMs of example 14, these results demonstrate the significant effect of the presence of these reactive CPMs on the improvement in the cracking resistance and in the impact strength of the vinyl ester matrix, without significant loss with regard to the glass transition temperature and the mechanical modulus or a negative effect on the suitability for processing.

It is obvious that the same thermosetting compositions described above can also be used for mechanical, thermal or chemical protective coating applications on various substrates with the same mechanical and thermal performance as that demonstrated for the molding applications.

What is claimed is:

1. A thermosetting composition comprising crosslinked polymer microparticles with a size of between 10 and 200 nm, wherein the microparticles are at least partially soluble, miscible and/or dispersible in the starting thermosetting composition and carry at least one first reactive functional group which can react with at least one reactive functional group carried by at least one reactive component of the thermosetting composition wherein the microparticles carry at least one functional group which reacts by a polycondensation reaction and at least one second functional group which is an α,β-ethylenic unsaturation which can polymerize by the radical route or by a specific Michael reaction and wherein the thermosetting composition comprises:
   a) at least one unsaturated polyester and/or at least one unsaturated polyester modified by a poly-isocyanate and/or at least one vinyl ester,
   b) at least one copolymerizable comonomer carrying at least one α,β-ethylenic unsaturation chosen from vinylaromatic and/or (meth)acrylic and/or allyl monomers,
   c) optionally at least one second monomer carrying at least two reactive functional groups, one of which can polymerize by the radical route and the other by a condensation reaction,
   d) 0.5–50% by weight of the said reactive crosslinked microparticles.

2. The composition as claimed in claim 1, wherein said microparticles carry at least one (meth)acrylate or hydrogen maleate functional group.

3. The composition as claimed in claim 1, wherein said microparticles can be obtained by a first polymerization stage starting from:
   i) 10–40 mol % of Cardura E10 (meth)acrylate,
   ii) 10–75 mol % of butyl and/or tert-butyl and/or 2-ethylhexyl and/or 2-(2-ethoxyethoxy)ethyl (meth)acrylate and of styrene, with a molar ratio of styrene to (meth)acrylic monomers varying from 0 to 0.2,
   iii) 5–40 mol % of hydroxyethyl (meth)acrylate, maleic anhydride, (meth)acrylic acid or glycidyl methacrylate,
   iv) 2–10 mol % of hexanediol and/or propylene glycol and/or neopentyl glycol and/or trimethylolpropane (meth)acrylate, with the sum of the molar percentages of all these constituents i)+ii)+iii)+iv) being equal to 100, followed by a second stage of at least partial chemical modification of the starting reactive functional groups according to:

the starting hydroxyl functional groups to hydrogen maleates by reaction with maleic anhydride and/or to (meth) acrylates by reaction with (meth)acrylic acid, the starting epoxy functional groups to (meth)acrylates by reaction with (meth)acrylic acid, the acid functional groups to methacrylate by reaction with glycidyl methacrylate, the anhydride functional groups to (meth)acrylates and residual acids by reaction with a hydroxyethyl or hydroxypropyl (meth) acrylate or with glycidyl methacrylate.

4. A coating comprising the composition of claim 1.

5. The coating of claim 4, wherein said coatings are protective coatings for electrical or electronic components, items or devices.

6. The thermosetting composition of claim 1 applied to molded items and of items made of composite materials.

7. A thermoset matrix obtained from the thermosetting composition of claim 1.

8. A protective coating, molded item or item made of composite materials obtained from the thermosetting composition of claim 1.

* * * * *